(12) United States Patent
Michaud et al.

(10) Patent No.: US 7,073,755 B2
(45) Date of Patent: Jul. 11, 2006

(54) FAST SCREW PIPE CLAMP

(75) Inventors: Alain Michaud, St. Luc (CA); William Smith, Kirkland (CA)

(73) Assignee: Thomas & Betts International, Inc., Wilmington, DE (US)

( * ) Notice: Subject to any disclaimer, the term of this patent is extended or adjusted under 35 U.S.C. 154(b) by 86 days.

(21) Appl. No.: 10/869,192

(22) Filed: Jun. 16, 2004

(65) Prior Publication Data

US 2005/0072883 A1   Apr. 7, 2005

Related U.S. Application Data

(60) Provisional application No. 60/483,876, filed on Jun. 30, 2003.

(51) Int. Cl.
*F16L 3/24* (2006.01)

(52) U.S. Cl. .................. 248/72; 248/74.1; 411/433

(58) Field of Classification Search .............. 248/74.1, 248/62, 65, 67.5, 70, 74.4, 229.12, 229.22, 248/220.3, 231.41, 316.4, 510; 411/433, 411/267
See application file for complete search history.

(56) References Cited

U.S. PATENT DOCUMENTS

| 4,378,187 | A | 3/1983 | Fullerton ............... 411/267 |
| 4,533,424 | A * | 8/1985 | McElroy ................. 156/378 |
| 5,085,550 | A | 2/1992 | Kendrick ................ 411/432 |
| 5,106,251 | A | 4/1992 | Steinbach ............... 411/433 |
| 5,118,237 | A | 6/1992 | Wright ................... 411/433 |
| 5,152,651 | A | 10/1992 | Artéon .................. 411/433 |
| 5,226,678 | A | 7/1993 | Petranto ................. 285/39 |
| 5,944,467 | A | 8/1999 | Yuta ..................... 411/433 |
| 6,361,260 | B1 * | 3/2002 | Schirrmacher .......... 411/433 |
| 2002/0000498 | A1 * | 1/2002 | Workman ................ 248/62 |
| 2005/0006535 | A1 * | 1/2005 | Brown et al. ............ 248/70 |

* cited by examiner

*Primary Examiner*—Ramon O Ramirez
(74) *Attorney, Agent, or Firm*—Hoffmann & Baron, LLP

(57) ABSTRACT

A pipe clamp secures a pipe to a structural member. The pipe clamp includes an inverted U-shaped clamp body having a transverse surface and a pair of spaced-apart legs for attachment to the structural member. A threaded bolt is moveably accommodated through an opening in the transverse surface. The pipe engagement saddle is positioned at the distal end of the bolt. A split nut, supported by the transverse surface, provides for moveable accommodation of the threaded bolt there through. A split nut is configurable between a first condition wherein the threaded bolt is moveable under screw threaded operation; a second condition wherein the bolt is moveable through the nut under non-screw threaded operation. Movement of the bolt under the first or second condition affects movement of the saddle with respect to the pipe.

14 Claims, 5 Drawing Sheets

FAST SCREW PIPE CLAMP

CROSS-REFERENCE TO RELATED APPLICATIONS

This application claims priority to U.S. Provisional Application No. 60/483,876, filed Jun. 30, 2003.

FIELD OF THE INVENTION

The present invention relates generally to an improved pipe clamp for securing a pipe to a secondary structure. More particularly, the present invention relates to a pipe clamp assembly which more efficiently and effectively secures a clamp to a pipe. The present invention provides a nut and bolt clamp system which allows the clamp to be attached to pipes of different diameters.

BACKGROUND OF THE INVENTION

The use of pipe clamps to attach or fasten pipes to support structures is well known. One clamp of this type typically includes an inverted U-shaped bracket having a transverse surface and a pair of spaced-apart depending legs which support the pipe therebetween. The distal end of the legs may be attached to a structural member such as a support strut or other similar device. The transverse surface of the clamp supports a threaded bolt therethrough having a pipe saddle movably seated between the depending legs. As the bolt is advanced with respect to the transverse surface, the saddle moves downwardly to seat and force the pipe between the saddle and the structural member, thereby securing the pipe to the structural member.

As may be appreciated, various sizes of pipe may be supported within the clamp as the saddle is movable with respect thereto by actuation of the threaded bolt. Typically, the bolt is provided in an open position with the bolt being nearly completely retracted and the saddle being positioned in an upward location with respect to the clamp. This allows a larger sized pipe to be inserted into the clamp. However, as may also be appreciated, when a smaller diameter pipe is employed, the saddle must be substantially advanced by screw actuation of the bolt to move the saddle downward to the smaller sized pipe to secure the pipe to the structural member.

A large part of the time attributed to installation of pipe clamps, is the need to advance the bolt toward the pipe to tighten the pipe to the structural member. For certain small diameter pipes, it has been found that in excess of 12–15 turns of the bolt is required to effectively secure the pipe to the structural member. Such operation is both time-consuming and costly, as installation time contributes to the overall cost of the installation project.

It is therefore desirable to provide an improved pipe clamp which can be more efficiently and effectively used to secure pipes to a structural member and which accommodates such efficient fashion for pipes of different diameters.

SUMMARY OF THE INVENTION

In the efficient attainment of these and other advantages, an improved pipe clamp assembly for securing the pipe to a structural lumber is provided. The pipe clamp assembly has an inverted U-shaped clamp body having a transverse surface and a pair of spaced apart legs depending from the transverse surface. An area for receiving a pipe between the pair of spaced apart legs is provided. The spaced-apart legs further possess distal portions for attachment to the structural member. A threaded bolt is moveably accommodated through an opening in the transverse member of the inverted U-shaped clamp body. A pipe-engaging saddle is positioned at the distal end of the threaded bolt within the pipe receiving location between the spaced apart legs. Furthermore, a split nut is supported by the transverse surface of the U-shaped clamp body. This split nut moveably accommodates the threaded bolt therethrough and is manually configurable between a first condition where the threaded bolt is moveable through this split nut under screw-threaded operation and a second condition wherein the bolt is moveable under non-screw-threaded operation. The movement of the threaded bolt through the split nut under the first and second conditions effects movement of the pipe engaging saddle with respect to the pipe, i.e., the threaded bolt axially moves through the split nut so that the pipe engaging saddle may engage the pipe.

The present invention also provides a method of securing a pipe to a structural member. The method includes providing a pipe clamp having a U-shaped body and a pipe clamp saddle attached to a threaded bolt. The threaded bolt is moveable with respect to the pipe clamp body through an actuatable split nut. The bolt is moveable through the split nut under screw actuation in a first condition and is moveable under non-screw actuation in a second condition. The pipe is inserted between the clamp saddle and the strut. The split nut is actuated to place the split nut in the second condition. The bolt is moveable under non-screw threaded actuation to place the saddle in contact with the pipe. The split nut is returned to the first condition and the bolt is moveable under screw threaded actuation to tighten saddle on the pipe. The split nut is moveable between the first and second condition under actuation of a tension spring.

In another embodiment of the present invention, a pipe clamp assembly is provided for securing a pipe to a structural member. The pipe clamp assembly has an inverted U-shaped clamp body having a curved semi-circular surface with a pair of spaced-apart legs depending therefrom. The pair of spaced-apart legs define a pipe receiving location therebetween and further include distal portions for attachment of the spaced apart legs to a structural member, such as a strut. A threaded bolt is moveably accommodated through an opening in the curved semi-circular surface and has a pipe engaging saddle positioned at a distal end thereof. The threaded bolt axially moves through the semi-circular surface so that the pipe engaging saddle may ultimately engage the pipe in the pipe receiving location between depending legs of the U-shaped clamp body. A split nut is supported by the curved semi-circular surface and moveably accommodates the threaded bolt therethrough. The split nut is manually configurable between a first condition and a second condition. In the first condition of the split nut, a threaded bolt is moveable therethrough under screw-threaded operation. In the second condition of the split nut, a threaded bolt is moveable therethrough under non-screw threaded operation. A pair of shoulders projects laterally from the U-shaped clamp body at an area where the curved semi-circular surface meets the pair of spaced-apart legs. Movement of the threaded bolt under the first or second conditions of the split nut effects movement of the pipe engaging saddle with respect to the pipe.

DETAILED DESCRIPTION OF THE PREFERRED EMBODIMENTS

Figure 1:
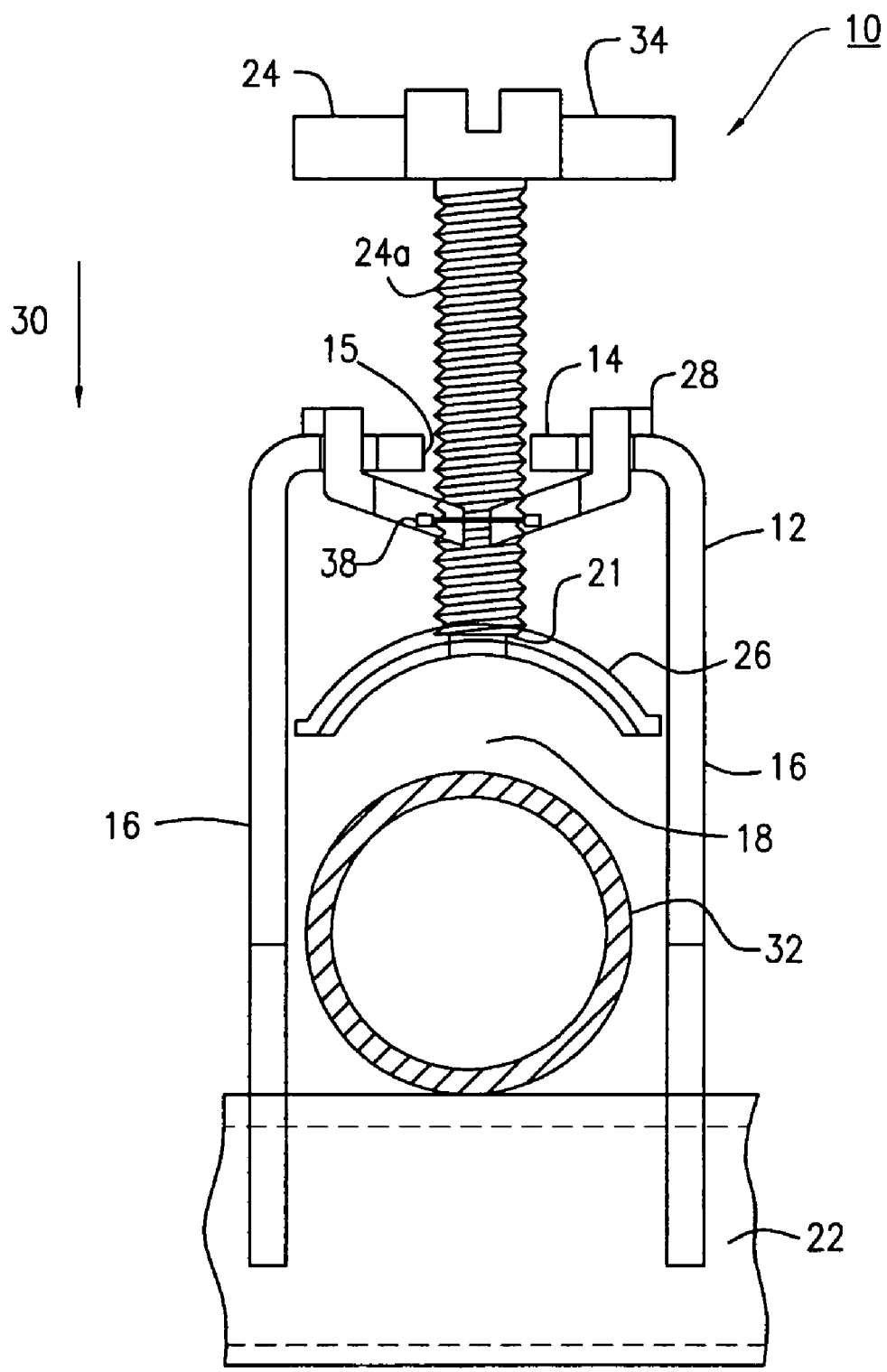
FIG. 1 shows a front plan view, in partial cross-section, of the pipe clamp assembly of the present invention.

A pipe clamp for securing a pipe to a structural member, such as a strut, is provided by the present invention. The improved pipe clamp 10 (also referred to as a pipe clamp assembly), is shown in FIG. 1. The improved pipe clamp includes an inverted U-shaped clamp body 12 having a transverse surface 14 and a pair of spaced-apart legs 16 depending from transverse surface 12. Spaced-apart legs 16 define a pipe receiving location 18 therebetween underneath transverse surface 14. Spaced-apart legs 16 also include distal portions 20 for attachment to a structural member, such as strut 22 shown in FIG. 3. In this regard, distal portions 20 may include hook-like ends 23 which are engageable with the lip 22a of a conventional U-shaped strut 22.

A bolt 24 which includes a threaded shaft 24a is moveably accommodated through an opening in transverse surface 14. A pipe-engaging saddle 26 is supported at a distal end 21 of threaded shaft 24a to be positioned in pipe receiving location 18 of U-shaped clamp body 12.

A split nut 28 is supported by transverse surface 14 and moveably accommodates threaded bolt 24 therethrough. Split nut 28 is formed of two opposed elements 36. Each element 36 includes a first portion 36a having finger grip members 36b and an inner member 36c. Inner members 36c meet to define a substantially circumferential internally threaded aperture 37 which accommodates the shaft 24a. Elements 36 are supported on transverse surface 14 through an opening 15 therethrough. Finger grip portions 36b are supported exteriorly of clamp body 12, while inner members 36c are supported within pipe receiving location. Each element 36 is manually pivotable about opening 15.

The elements 36 are movably interconnected by tension spring mechanism 38 which may be an elastic tension clip or another similar mechanism with elastic or swivel properties which allows split nut 28 to be manually configurable between a first condition and a second condition.

The split nut 28 is manually configurable between a first condition wherein threaded bolt 24 is moveable therethrough under screw-threaded operation. Split nut 28 is also manually configurable to a second condition wherein the threaded bolt 24 is moveable therethrough under non-screw threaded operation. Threaded bolt 24 axially moves through split nut 28 in the direction of directional arrow 30 in order to position saddle 26 in an engaging position on a pipe 32.

Figure 2:
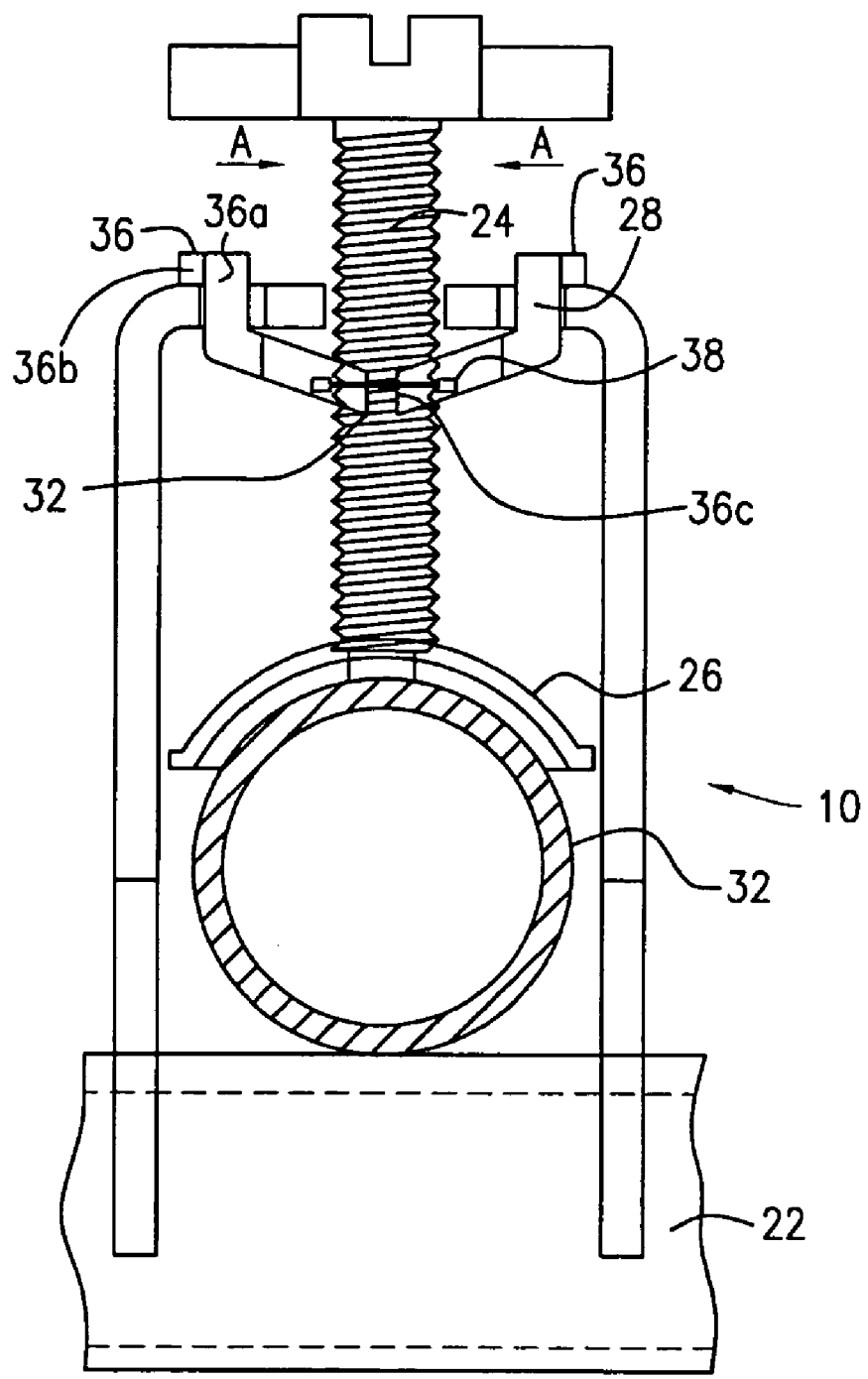
FIG. 2 shows the pipe clamp assembly of FIG. 1 in pipe-securing position with pipe-engaging saddle engaging in the pipe.
Figure 3:
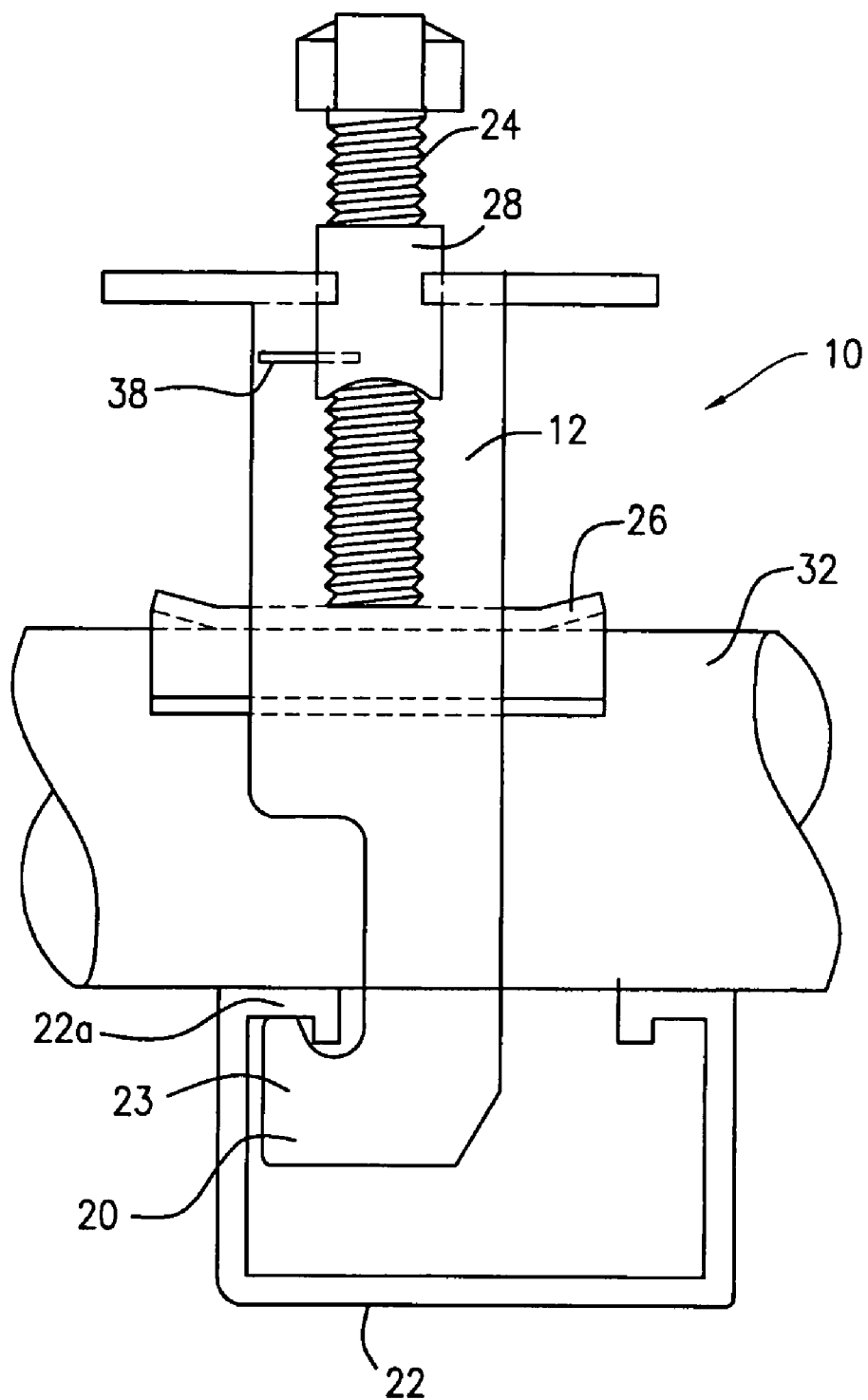
FIG. 3 shows a schematic side view of the pipe clamp assembly as FIGS. 1 and 2 attaching the pipe to a structural member.

With further reference to FIGS. 1–3 a description of the operation of the pipe clamp of the present invention is herein provided. Pipe clamp 10 is used to secure a pipe 32 or similar object to a structural member, such as a strut 22. The pipe clamp 10 however may be used to attach pipe 32 to any number of structural elements and is not limited to struts. Pipe clamp assembly 10 includes distal portions 20 as attachment members which are used to attach U-shaped clamp body 12, and in turn pipe 32 to the strut or other structural member. Pipe 32 lies above strut 22 to which it is intended to be attached. Pipe clamp 10 is placed above and around pipe 32 so that distal portions 20 are attached to the structural member and spaced-apart legs 16 surround pipe 32.

Pipe engaging saddle 26 is positioned at a distal end of threaded bolt 24, and engages pipe 32 in pipe receiving location 18 in order to clamp pipe 32 to strut 22. Threaded bolt 24 includes a screw head 34 which is designed for receiving the blade of a screwdriver or similar tool (not shown). Threaded bolt 24 axially moves through transverse surface 14 and more specifically split nut 28, which is supported by transverse surface 14.

Under the bias of tension spring 38, elements 36 are maintained in a closed or compressed condition such that threaded shaft 24a of a bolt 24 is in screw threaded engagement with the internally threaded aperture 37. In this condition bolt 24 maybe screw advanced through aperture 37.

Figure 5:
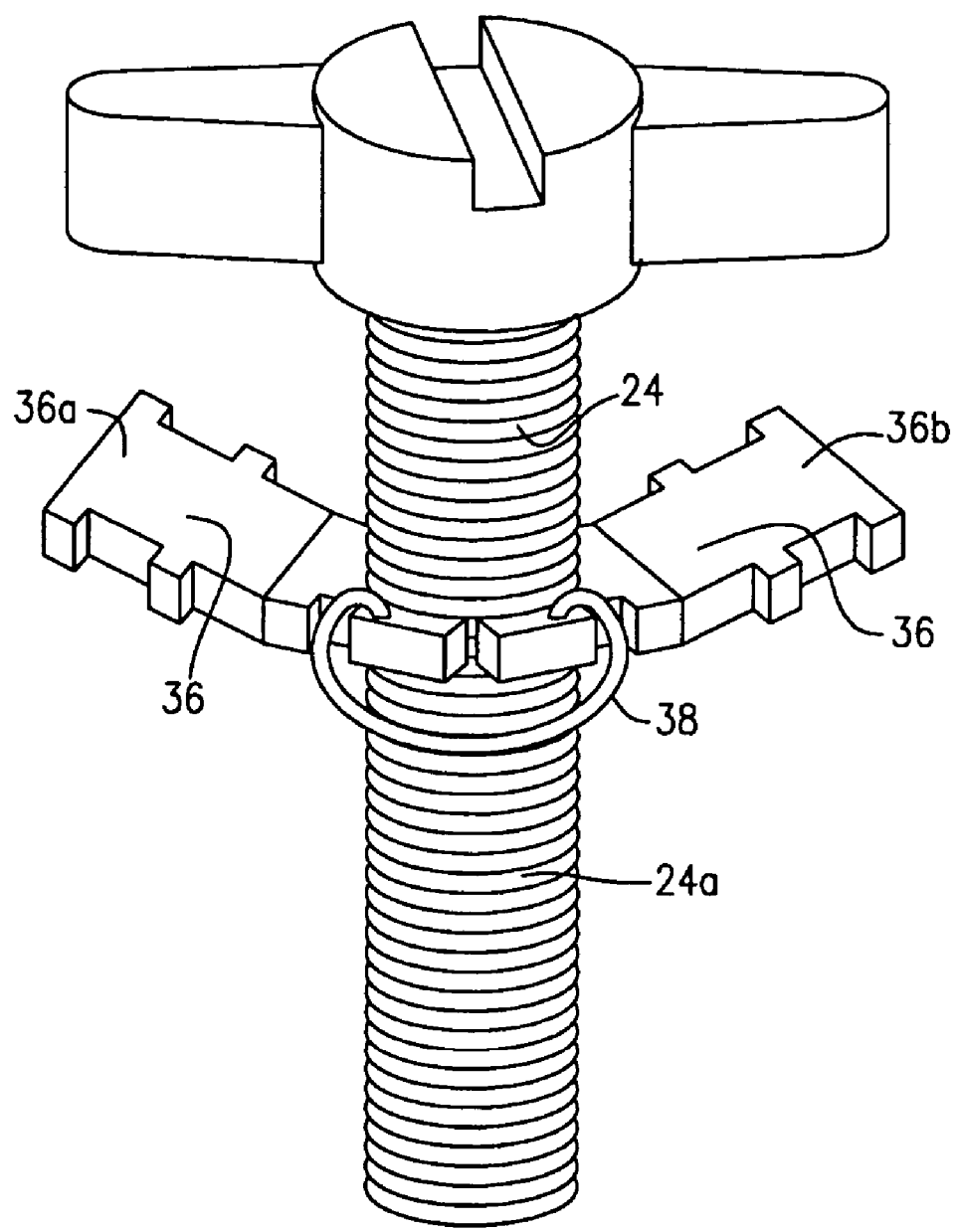
FIG. 5 shows the threaded bolt and split nut of the pipe clamp assembly of the present invention.

As additionally shown in FIG. 5, elements 36 are movable against the bias of tension spring 38 to spread open inner members 36c removing elements 36 from screw engagement with the threaded shaft 24a of bolt 24. Such movement is achieved by manual activation of finger grip members 36b inwardly in the direction of arrows A (FIG. 2) so that elements 36 pivot about transverse surface 14 through aperture 15. In this condition bolt 24 is moveable through aperture 37 without screw threaded operation.

As may be appreciated when elements 36 are in screw-threaded engagement with threaded shaft 24a, bolt 24 may be advanced only under screw-threaded movement. However, when elements 36 are out of screw threaded engagement with bolt 24, the bolt may be advanced by direct non-screw threaded movement, such non-screw threaded movement allow for quicker and easier advancement of the saddle 26 with respect to the pipe 32.

Having described the components of the pipe clamp assembly of the present invention, its operation in securing a pipe to a strut may now be described.

Referring to the figures, the pipe clamp 10 with the saddle 26 fully retracted, is attached to strut 22. The pipe 32 is inserted within the pipe receiving location so that it sits on the upper surface of strut 22. In order to quickly advance the saddle 26 toward pipe 32, the elements are pivoted by movement of finger-grip members in the direction of arrows A (FIG. 5). This releases threaded shaft 24a from screw-threaded engagement with threaded aperture 37 as inner members pivotably move away from each other. Threaded bolt 24 and saddle 26 may now be longitudinally advanced in a quick non-screw threaded movement until saddle 26 seats on pipe 32. Once this is achieved, finger grip members may be released so that aperture 37 return, under the bias of tension spring 38, to screw threaded engagement with threaded bolt 24. Then saddle 26 can be tightened down onto pipe 32 by screw tightening of bolt 24. The mechanical advantage provided by the screw threads helps tighten the clamp about the pipe.

The present invention allows the saddle 26 to be brought down onto pipe 32 without the need to screw thread it onto the pipe. However it may be appreciated that, in certain situations, such as with larger pipes, the saddle 26 can be entirely screw threaded onto the pipe if desired.

Figure 4:
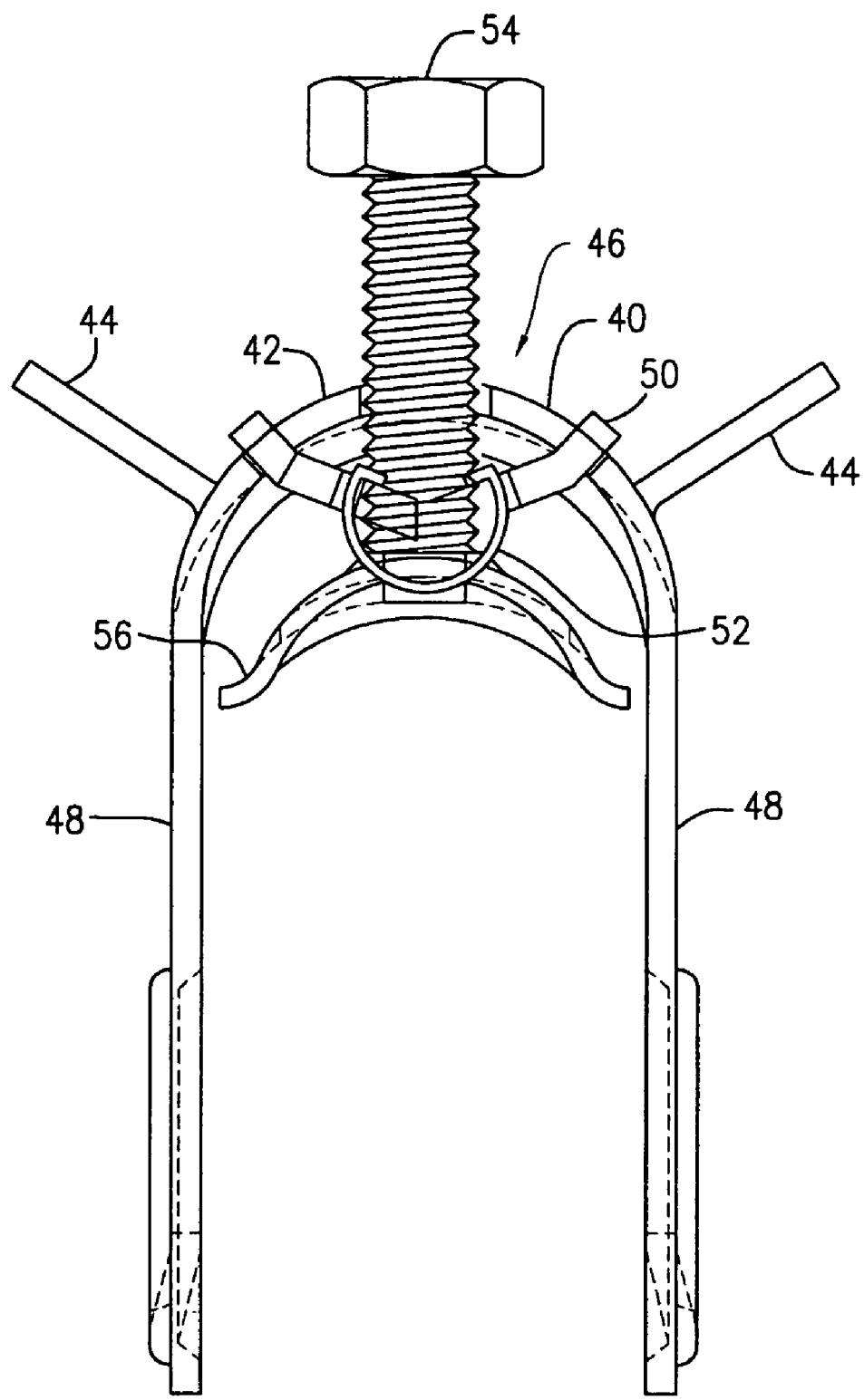
FIG. 4 shows a schematic front view of another embodiment of the pipe clamp assembly of the present invention.

In an alternate embodiment of the present invention as seen in FIG. 4, U-shaped clamp body 40 has a curved semicircular transverse surface 42. Pipe clamp assembly 46 further includes shoulders 44 laterally projecting from an area where curved semicircular surface 42 meets spaced apart legs 48. Pipe clamp assembly 46 similarly possesses a split nut 50 as well as a similar tension spring mechanism 52 linking opposed semicircular threaded members of split nut 50 together.

In the present embodiment, the tension spring mechanism 52 is shown as a circular tension clip which allows split nut 50 to swivel apart and threaded bolt 54 to axially traverse split nut 50 under non-screw threaded operation until pipe engaging saddle 56 engages a pipe (not shown). Shoulders 44 allow further ease of operation as a user may grip shoulders 44 with his or her fingers while the user's thumbs apply a downward force on threaded bolt 54 in order to allow pipe engaging saddle 56 to engage a pipe.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A pipe clamp for securing a pipe to a structural member comprising:
    an inverted U-shaped clamp body having a transverse surface and a pair of spaced apart legs depending from said transverse surface to define a pipe receiving location therebetween, said legs including distal portions for attachment to said structural member;
    a threaded bolt movably accommodated through an opening in said transverse surface;
    a pipe engaging saddle positioned at a distal end of said bolt within said pipe receiving location; and
    a split nut supported by said transverse surface movably accommodating said threaded bolt therethrough, said split nut being manually configurable between a first condition wherein said threaded bolt is movable therethrough under screw-threaded operation, and a second condition wherein said bolt is movable therethrough under non-screw threaded operation;
    wherein said movement of said bolt under said first or second conditions effects movement of said saddle with respect to said pipe.

2. A pipe clamp according to claim 1 wherein said split nut includes a pair of nut elements defining a threaded aperture therebetween for accommodating said bolt.

3. A pipe clamp according to claim 2 wherein said split nut further includes a tension spring for supporting said nut elements in said first and second conditions.

4. A pipe clamp according to claim 3 wherein said pair of nut elements are internally threaded for mating engagement with said threaded bolt.

5. A pipe clamp according to claim 4 wherein said split nut further includes finger grip members.

6. A pipe clamp according to claim 5 wherein said finger grip members are actuatable to facilitate movable transition of said split nut to said second condition.

7. A pipe clamp of claim 3 where said tension spring is a generally circular tension clip.

8. A pipe clamp according to claim 1 wherein said split nut is supported in openings in said transverse surface.

9. A pipe clamp of claim 1 wherein said traverse surface is curved.

10. A pipe clamp of claim 9 including a pair of projecting shoulders extending outwardly from said curved traverse surface.

11. A method of securing a pipe to a structural member comprising the steps of:
    providing a pipe clamp having a U-shaped body and a pipe clamp saddle attached to a threaded bolt, said threaded bolt being moveable with respect to said clamp body through an operable split nut,
    said bolt being moveable through said split nut under screw actuation in a first condition, and moveable through said split nut under non-screw actuation in a second condition;
    inserting a pipe between said clamp saddle and said strut;
    placing said split nut in said second condition;
    moving said bolt under non-screw thread to place said saddle in contact with said pipe;
    returning said split nut to said first condition;
    moving said bolt under screw thread actuation to tighten said saddle onto said pipe.

12. A method of claim 11 wherein said split nut is moveably supported between said first and second conditions by a tension spring.

13. A method of claim 12 wherein said split nut is held in said first condition under the bias of said tension spring.

14. A method of claim 13 where said split nut is moveable to said second condition against the bias of said tension spring.

* * * * *